F. BRUNON.
Beer Cooler.
No. 40,977.  Patented Dec. 15, 1863.
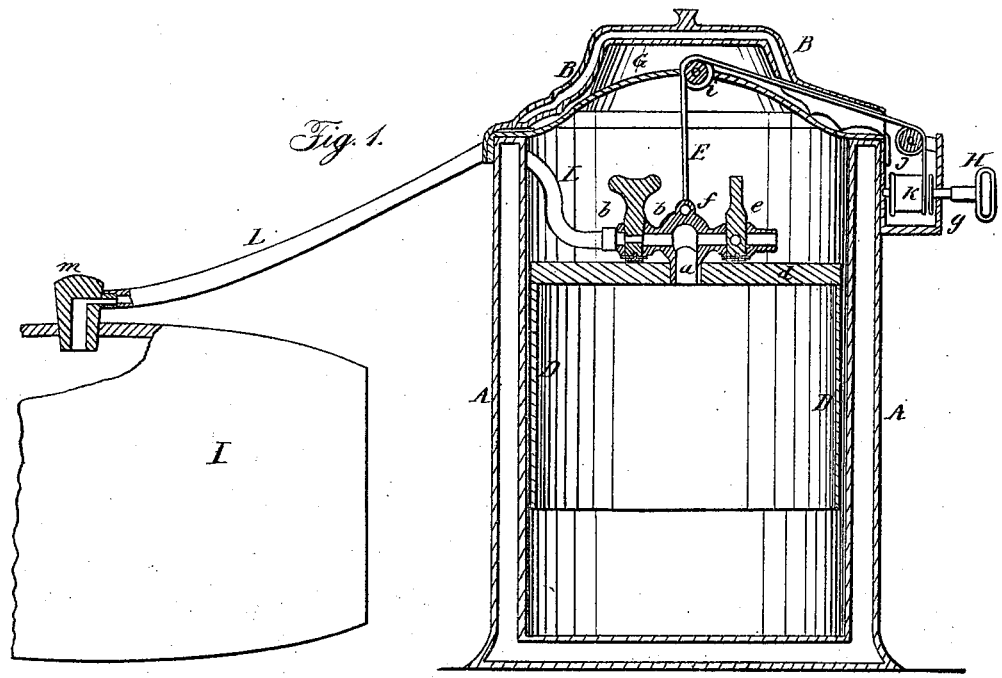
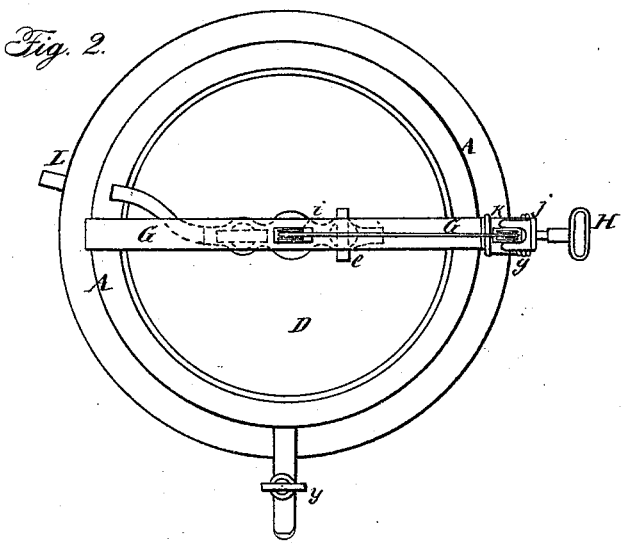
Witnesses:
W. Albert Steel
Charles Howson
Inventor:
F. Brunon
per Henry Howson
Atty

UNITED STATES PATENT OFFICE.

FELIX BRUNON, OF PHILADELPHIA, PENNSYLVANIA, ASSIGNOR TO HIMSELF AND JOSEPH M. NAGLEE, OF SAME PLACE.

IMPROVEMENT IN COOLING AND DISCHARGING FERMENTED LIQUORS.

Specification forming part of Letters Patent No. 40,977, dated December 15, 1863.

*To all whom it may concern:*

Be it known that I, FELIX BRUNON, of Philadelphia, Pennsylvania, have invented certain Apparatus for Cooling, Preserving, and Discharging Liquors; and I do hereby declare the following to be a full, clear, and exact description of the same, reference being had to the accompanying drawings and to the letters of reference marked thereon.

My invention consists of a vessel of any suitable form for containing ice and water and a weighted inverted vessel, in combination with cocks and tubes, hereinafter described, or any equivalent to the same, the whole operating, substantially as described hereinafter, for the purpose of cooling, preserving, and discharging malt and other liquors.

In order to enable others to make and use my invention, I will now proceed to describe its construction and operation.

On reference to the accompanying drawings, which form a part of this specification, Figure 1 is a vertical section of my apparatus for cooling, preserving, and discharging fermented and other liquors and Fig. 2 is a plan view of the apparatus with the cover removed.

A is a vessel of any desired form, and is constructed in the same manner as an ordinary water-cooler—that is, with an outer and inner casing—between which intervenes a space filled with charcoal, cork-shavings, or other equivalent material, the vessel being provided with a suitable cover, B. Within the vessel A is an inverted vessel, D, to the top $d$ of which is secured the tube $a$, two stop-cocks, $b$ and $e$, projecting from and communicating with this tube. The inverted vessel D is suspended by a cord or chain, E, to a cross-piece, G, which rests on the upper edge of the vessel A, the said cord or chain being attached to an eye, $f$, between the stop-cocks, passing over a pulley, $i$, which turns in the cross-piece G, thence over a pulley, $j$, and round the roller or drum $k$, this pulley and roller turning in a frame-work, $g$, which projects from the side of the vessel, and which in the present instance forms a part of the cross-piece G. One journal of the roller $k$ projects beyond the frame $g$, and is made of a square or other form adapted to a key, H, by turning which the cord or chain is wound round the roller $k$, and the inverted vessel D consequently elevated.

In the present instance the apparatus is illustrated as applied to the cooling of malt liquor contained in the barrel I, the bung $m$ of which is hollow and made to communicate with the stop cock $b$ through a gum-elastic tube, L.

In applying the apparatus, ice and water are in the first place deposited in the vessel A, after which the inverted vessel D (both of the stop-cocks $b$ and $e$ being closed) is introduced, its edge being immersed in the water, between the surface of which and the top $d$ of the inverted vessel is a supply of air, the latter being constantly maintained in a cool state by exposure to the ice and water in the vessel A. The tube L is then connected to the bung, the stop-cock $b$ opened, and the cover B placed on the top of the vessel.

It will be evident that as there is a direct communication between the supply of cold air within the inverted vessel D and the interior of the barrel I, the liquor in the latter must be maintained in a cool state. Whatever quantity of liquor may be drawn from the barrel a supply of cold air from the inverted vessel D must take its place, inasmuch as the weight of the vessel itself, and any additional weight which may be deemed necessary, tends to force the air through the tube L. When the air within the vessel D has been expended, owing to the drawing off of the liquor from the barrel I, the cover B is removed, the stop-cock $b$ is closed, the cock $e$ opened, and the vessel D is elevated by turning the journal $k$. A new supply of air is thus permitted to pass into the vessel D through the stop-cock $e$, which is now closed and the cock $b$ opened. The fresh air thus introduced is soon cooled by exposure to the ice and water, and a corresponding coolness is imparted to the liquor in the barrel.

In addition to the maintaining of the liquor in a cool state, the apparatus has the further advantage of imparting to the surface of the liquor a pressure commensurate with the weight applied to the inverted vessel D. The advantage of this in places where it is desirable to have the cooling apparatus placed below the barrel will be apparent.

A third advantage of the apparatus is its utility as regards the preservation of the liquor in the barrel.

In drawing off malt liquor from a barrel it is usual, in fact, necessary, to leave the bung open, or make an independent vent-opening. The liquor is consequently exposed to the air, and the injury of this exposure, especially to fermented liquors, is well known. By my apparatus this injurious action is prevented, inasmuch as no more air is at any time admitted than just sufficient to take the place of the quantity of liquor drawn from the barrel.

While the apparatus possesses the above important advantages, it is serviceable as an ordinary water-cooler, a stop-cock, $y$, being secured to and communicating with the interior of the vessel, from which the iced water can be drawn at pleasure.

It will be evident that different systems of stop-cocks or valves may be adopted in place of those illustrated, that the mechanism for raising the inverted vessel may be modified, and the general construction and arrangement of the several parts may be altered without departing from the main features of my invention.

I therefore claim as my invention, and desire to secure by Letters Patent—

A vessel, A, of any suitable form for containing ice and water, and the weighted inverted vessel D, in combination with the cocks and tubes herein described, or any equivalent to the same, the whole operating, substantially as described, for the purpose specified.

In testimony whereof I have signed my name to this specification in the presence of two subscribing witnesses.

FELIX BRUNON.

Witnesses:
HENRY HOWSON,
JOHN WHITE.